US011057459B2

(12) United States Patent
Patel et al.

(10) Patent No.: US 11,057,459 B2
(45) Date of Patent: Jul. 6, 2021

(54) DATAPATH-DRIVEN FULLY DISTRIBUTED EAST-WEST APPLICATION LOAD BALANCER

(71) Applicant: VMware, Inc., Palo Alto, CA (US)

(72) Inventors: Jagdish S. Patel, Santa Clara, CA (US); Srikanth V. Garimella, San Jose, CA (US); Mukesh Hira, Los Altos, CA (US)

(73) Assignee: VMware, Inc., Pal, CA (US)

( * ) Notice: Subject to any disclaimer, the term of this patent is extended or adjusted under 35 U.S.C. 154(b) by 113 days.

(21) Appl. No.: 16/001,557

(22) Filed: Jun. 6, 2018

(65) Prior Publication Data

US 2019/0379729 A1 Dec. 12, 2019

(51) Int. Cl.
*H04L 29/08* (2006.01)
*H04L 12/24* (2006.01)
*G06F 9/455* (2018.01)

(52) U.S. Cl.
CPC ...... *H04L 67/1008* (2013.01); *G06F 9/45558* (2013.01); *H04L 41/14* (2013.01)

(58) Field of Classification Search
CPC ............... H04L 67/1002; H04L 47/125; H04L 61/2521; H04L 61/6022; H04L 67/1008; H04L 41/14; H04L 43/0876; H04L 12/26; H04L 43/10; H04L 41/142; G06F 9/45558; G06F 9/5083; G06F 9/45533; G06F 9/455; G06F 11/30
See application file for complete search history.

(56) References Cited

U.S. PATENT DOCUMENTS

| 9,407,692 B2* | 8/2016 | Rajagopalan | H04L 67/1014 |
| 2013/0136126 A1* | 5/2013 | Wang | H04L 61/103 370/392 |
| 2013/0304899 A1* | 11/2013 | Winkler | H04L 67/34 709/224 |

(Continued)

OTHER PUBLICATIONS

U.S. Appl. No. 15/939,131, filed Mar. 28, 2017.

(Continued)

*Primary Examiner* — Chirag R Patel
(74) *Attorney, Agent, or Firm* — Patterson + Sheridan, LLP

(57) ABSTRACT

The disclosure provides an approach for load balancing packets within a data center. The approach leverages dynamically collected and up-to-date health information on each virtual computing instance located within the data center. In one embodiment, health monitoring modules, located within hypervisors of each host computer, collect health statistics on local virtual computing instances. Each health monitoring module shares its locally collected health statistics with every other health monitoring module. Each health monitoring module provides the shared health statistics, on all virtual computing instances within the data center, to a local load balancing module located within the hypervisor of each host computer. Each load balancing module uses health statistics of all virtual computing instances to load balance packets within the data center. Further, the disclosure describes an affinity-based load balancing approach in which a local load balancing module may give preference to local virtual computing instances when making load balancing decisions.

20 Claims, 7 Drawing Sheets

(56) References Cited

U.S. PATENT DOCUMENTS

| | | | |
|---|---|---|---|
| 2015/0234668 A1* | 8/2015 | Ravinoothala | G06F 9/45558 |
| | | | 718/1 |
| 2017/0163602 A1* | 6/2017 | Douglass | H04L 63/0227 |
| 2018/0062881 A1 | 3/2018 | Chandrashekhar et al. | |
| 2018/0063233 A1* | 3/2018 | Park | H04L 47/125 |
| 2018/0139148 A1* | 5/2018 | Gamage | H04L 47/822 |
| 2018/0295036 A1* | 10/2018 | Krishnamurthy | H04L 41/0893 |
| 2019/0037033 A1* | 1/2019 | Khakimov | H04L 67/02 |
| 2019/0052598 A1* | 2/2019 | Hira | H04L 61/2521 |

OTHER PUBLICATIONS

R. Gandhi et. al. "Duet: Cloud-scale load balancing with hardware and software" SIGCOMM 2014.

P. Patel et. al. "Ananta: Cloud-scale load balancing" SIGCOMM 2013.

D. Eisenbud et. al. "Maglev: A Fast and Reliable Software Network Load Balancer", NSDI 2016 https://ai.google/research/pubs/pub44824.

Cloud Native Computing Foundation Website https://www.cncf.io/.

Internet Engineering Task Force (IETF) Jun. 2010. https://tools.ietf.org/html/rfc5880.

* cited by examiner

DATAPATH-DRIVEN FULLY DISTRIBUTED EAST-WEST APPLICATION LOAD BALANCER

BACKGROUND

Data centers typically have two types of traffic flows of network packets, each of which may be load balanced. One type of packet flow is a "North-South" flow, which refers to the flow of packets between network entities outside of the data center and network entities within the data center. A second type of packet flow is an "East-West" flow, which refers to the flow of packets between network entities within the data center.

FIG. 1 depicts a block diagram of a data center divided into application tiers, according to the prior art. Gateway 184, servers 186, 190, 194, and load balancers 188 and 192 of data center 100 are physical components (e.g., physical computing devices). A user device 180 may include a web browser or other application that generates requests to access an application running on one or more devices within data center 100. The application may be split into a number of smaller services, referred to as "microservices" that can communicate with each other (e.g., using well-defined application programming interfaces (APIs)). Each different microservice can run on a different device within data center 100, and further, the same microservice may be distributed among several devices that each run a copy of the same microservice to handle requests from multiple clients in a distributed fashion. Accordingly, an application may be divided into a number of tiers, each tier corresponding to a microservice of the application. Each tier may further run on one or more devices, meaning that the microservice associated with the tier runs in a distributed fashion on one or more devices. In the example shown in FIG. 1, the application is divided into three tiers: a web server tier, an app tier, and a data tier. Other applications may include a different number of tiers.

The user device 180, acting as a "client," transmits the request for the application in the form of one or more packets from user device 180 to data center 100 over network 182, which may be the Internet. The request reaches gateway 184 in data center 100, and gateway 184 routes the request to one of web servers 186 that run the web server tier of the application For example, gateway 184 may select one of web servers 186 based on a load balancing function (e.g., a round-robin algorithm). The selected web server 186 may act as a "server" for the client user device 180. By selecting one of web servers 186 to service the request of user device 180, gateway 184 performs a North-South load balancing function. Although not discussed, gateway 184 may also perform an East-West load balancing function.

The web server 186 selected by gateway 184 during load balancing may then send information in one or more packets back to user device 180. The information may be used by user device 180 to display an application user interface. User device 180 may generate another request for the application to access certain functions of the application, such as based on interaction with the user interface. These functions may be part of a microservice at the app tier, which runs on app servers 190. The user device 180 transmits the request to data center 100, and gateway 184 sends the request to the previously selected web server 186. The selected web server 186 then becomes a "client" that sends the request to application servers 190 via load balancer 188. When load balancer 188 receives the request, it selects one of app servers 190 to act as a server for the client web server 186 and service the request of the client web server 186. For example, load balancer 188 may select one of app servers 190 based on a load balancing function. By selecting one of app servers 190 to service the request of client web server 186, load balancer 188 performs an East-West load balancing function.

While performing the functions corresponding to the request, the selected app server 190 may need to access data, such as user data of user device 180. This user data may be stored in the data tier of the application running on data servers 194. The selected app server 190 then becomes a "client" that sends a data request for the user data to data servers 194 via load balancer 192, which selects one of data servers 194 to act as a server for the client application server 190 and service the data request of the client app server 190. For example, load balancer 192 may select one of data servers 194 based on a load balancing function. By selecting one of data servers 194 to service the data request of client app server 190, load balancer 190 again performs an East-West load balancing function.

In order for gateway 184 and load balancers 188, 194 to select a server for servicing a request, it is useful for gateway 184 and load balancer 188, 194 to have information on how busy the available servers are. Such information may be obtained by a central controller (not shown) that polls each server 186, 188, 196 of data center 100 to check the health status of that server. However, as the number of servers grows, a centralized health-check mechanism may not have the resources to efficiently poll all servers in data center 100.

SUMMARY

A method described herein provides load balancing of a network packet, the method comprising receiving, by a first health monitoring module running on a first host device, health information of a plurality of virtual computing instances that are running on a plurality of host devices, and providing, by the first HM module to a first load balancing module running on the first host device, the health information of the plurality of virtual computing instances. The method further comprises receiving, at the first LB module, a first network packet, and selecting, by the first LB module, a destination virtual computing instance from the plurality of virtual computing instances to process the first network packet based on the health information.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for load balancing packets within a data center. In an embodiment, health monitoring modules located on each host computer (e.g., within a hypervisor running on the host computer, separate from the hypervisor, as part of a datapath component that implements load balancing network address translation (NAT) functionality, etc.), collect health statistics on local virtual computing instances. Each health monitoring module shares its locally collected health statistics with every other health monitoring module within the data center. Each health monitoring module provides the totality of the shared health statistics to a local load balancing module located on each host computer (e.g., within a hypervisor running on the host computer, separate from the hypervisor, as part of a datapath component that implements load balancing NAT functionality, etc.). Each load balancing module uses the accumulated health statistics to load balance packets sent between virtual computing instances within the data center. In another embodiment, the health monitoring module and the load balancing module are present within each virtual computing instance running on a host computer, and the load balancing module balances packets sent between nested virtual computing instances that are running within the host virtual computing instances.

The disclosure provides a number of advantages over the prior art. As the number of servers grows, a decentralized health-check mechanism may have the resources to efficiently poll all servers in a data center. A decentralized health-check mechanism may catch a network disruption between two tiers of an application, because the decentralized health-check mechanism is spread out throughout a network. That is, a controller that polls servers centrally may have a healthy network connection to a server, but that server's connection to another server may be disrupted. The disruption might not be evident to a central controller, but would be evident to a decentralized health-check mechanism. Also, a decentralized health-check mechanism may prevent load balancing bottle-necks within a data center.

Figure 2A:
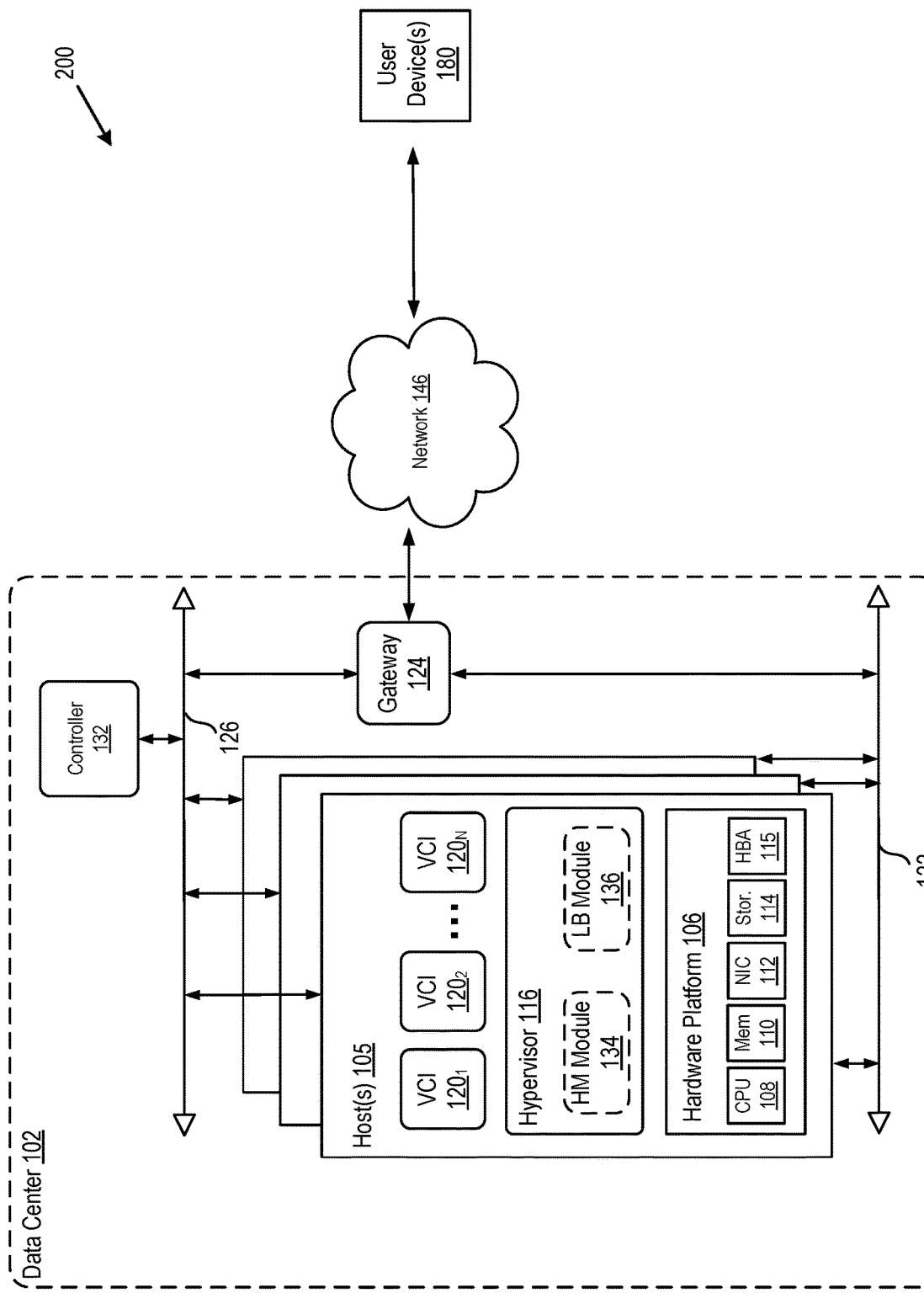
FIG. 2A depicts a block diagram of a computer system in which one or more embodiments of the present disclosure may be utilized.

FIG. 2A depicts a block diagram of a computer system 200 in which one or more embodiments of the present disclosure may be utilized. Computer system 200 includes data center 102 and user device(s) 180, connected by a network 146, such as the Internet. Data center 102 may be an on-premise data center or a cloud data center.

Data center 102 includes host(s) 105, a controller 132, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual computing instances (VCIs) $120_1$ to $120_N$ (collectively referred to as VCIs 120 and individually referred to as VCI 120) that may run concurrently on the same host. As used herein, the term "VCI" may refer to virtual machines (VMs), containers, Docker containers (see, e.g., www.docker.com), data compute nodes, isolated user space instances, namespace containers, and the like. In certain embodiments, VCIs 120 may be containers that run on host 105 without the use of a hypervisor.

Hypervisor architecture may vary. Hypervisor 116 may run on top of the operating system in host 105 or directly on hardware platform 106 of host 105. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine.

Hardware platform 106 of each host 105 may include components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents persistent storage devices (e.g., one or more hard disks, flash memory modules, solid state disks, and/or optical disks). Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

In some embodiments, VCIs 120 in data center 102 may be placed in communication across a logical network by connecting them to a logical switch (e.g., in a Layer 2 logical network), or by connecting them to multiple different logical switches (e.g., each in a different Layer 2 logical network) connected by a logical router (e.g., in a Layer 3 logical network connecting the different Layer 2 logical networks) decoupled from the underlying physical network infrastructure that interconnects hosts 105 so that VCIs on different host machines can communicate as part of the same network (e.g., Layer 2 network or Layer 3 network). A logical switch for a logical layer 2 network is collectively implemented by virtual switches on each host 105 that has a VCI connected to the logical layer 2 network. The virtual switch on each host operates as a managed edge switch implemented in software (e.g., by the hypervisor) on each host. A logical router for a logical layer 3 network is collectively implemented by virtual routers on each host 105 that has a VCI connected to the logical layer 3 network. The virtual router on each host operates as a router implemented in software by the hypervisor on each host. Forwarding tables at the virtual switches and/or virtual routers instruct the host to encapsulate packets, using a tunnel endpoint (TEP) from a participating VCI to another VCI on the logical network but on a different (destination) host with an outer IP header addressed to the destination host using a mapping of VCI IP addresses to host IP addresses. At the destination host, a second tunnel endpoint decapsulates the packet and then directs the packet to the destination VCI. Logical routers extend the Layer-2 logical network across subnets or other network boundaries using IP routing in the logical domain. Such functionality of a logical network (e.g., a logical Layer 2 network) is discussed further with respect to FIG. 2B.

In some embodiments, VCIs 120 in data center 102 may be placed in communication across a physical network, such as data network 122, without using logical networking. In such embodiments, the VCIs 120 may be directly addressable over the data network 122 and assigned MAC and IP addresses associated with the data network 122. In such a network, VCIs 120 on a host 150 may still be connected to a virtual switch on the host 105, and the virtual switch connected to data network 122 via NIC 112. However, the virtual switch may exchange packets between VCIs 120 and the data network 122 without encapsulation/decapsulation by a TEP.

It should be noted that certain embodiments are described herein with respect to VCIs in communication across a logical Layer-2 network, one of ordinary skill in the art will recognize that the techniques described herein can similarly be used with VCIs in communication across other types of networks, such as those discussed.

Hypervisor 116 includes a health monitoring (HM) module 134. Although not shown, in some embodiments, HM module 134 may instead run on host 105 and not in hypervisor 116 (e.g., outside hypervisor 116 and in communication with hypervisor 116). HM module 134 collects health information of VCIs 120 running on the same host 105 as the HM module 134 collecting the information. HM module 134 collects local health information by polling VCIs 120 running on the same host 105. As used herein, the term "local" means that the subject modified by the term "local" is located on the same host 105 or host VCI 320 (see FIG. 3) as that which is being discussed. For the embodiment shown in FIG. 2A, health information of VCIs 120 on the same host 105 as the HM module 134 collecting the health information is referred to herein as "local" health information. HM module 134 requests from each local VCI 120 health information, and each local VCI 120 responds with a message containing the health information. Health information of VCI 120 may include, for example, aliveness (whether VCI 120 is operational or is down), the number of active connections between VCI 120 and other components of data center 102, percent utilization of virtual CPU(s) of VCI 120, percent utilization of virtual memory allocated to VCI 120, whether a service (e.g., Hyper Text Transfer Protocol (HTTP) or File Transfer Protocol (FTP)) of VCI 120 is operational, and the like.

After each HM module 134 of data center 102 collects local health information, then each HM module 134 shares its local health information with other HM modules 134 of data center 102. After receiving local health information of other HM modules 134, each HM module 134 combines the local health information of the HM modules 134 into collected health information of every VCI 120 on data center 102. Each HM module 134 then passes the collected health information of every VCI 120 to the local load balancing (LB) module 136 located on the same host 105 as HM module 134. The result is that each LB module 136 of data center 102 contains all health information of all VCIs 120 in data center 102.

Health information may be shared among HM modules 134 by a variety of methods. For example, HM modules 134 may transmit packets (e.g., using a reliable protocol such as Transmission Control Protocol (TCP)) including the health information directly between HM modules 134 over data network 122, such as using the physical address of hosts 105 for addressing the packets or using TEPs to transmit the packets between VCIs. In another example, HM modules 134 may transmit the health information as control information using Bidirectional Forwarding Detection (BFD) protocol packets transmitted over data network 122, described in U.S. application Ser. No. 15/939,131, filed Mar. 28, 2017, the entire contents of which are incorporated by reference herein. In another example, HM modules 134 may transmit packets via a central controller, such as controller 132 over management network 126, such as by using TCP.

Figure 1:
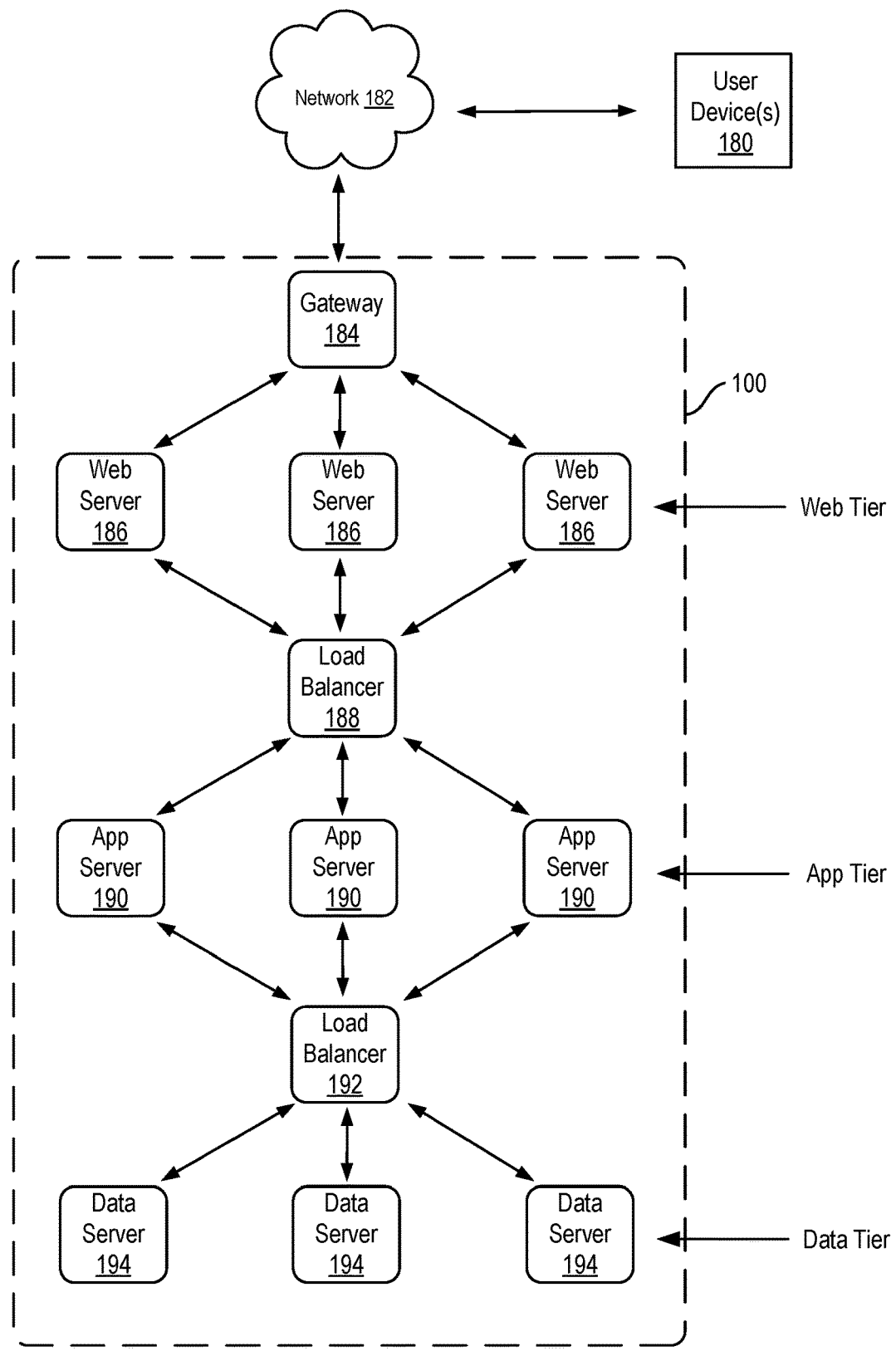
FIG. 1 depicts a block diagram of a data center divided into application tiers, showing prior art.

Hypervisor 116 includes LB module 136. Although not shown, in some embodiments, LB module 136 may instead run on host 105 and not in hypervisor 116 (e.g., outside hypervisor 116 and in communication with hypervisor 116). LB module 136 load balances network packets corresponding to requests transmitted within data center 102 based on health information of all VCIs 120 running in data center 102, the health information having been collected by HM module 134 and maintained locally within host 105. For example, each of the different tiers of an application (e.g., web server tier, application tier, data tier, etc.) may run on VCIs 120 in data center 102. Accordingly, a packet may need to be load balanced when a packet is sent by a client VCI 120 from a higher tier of an application (e.g., web server tier) to a server VCI 120 from a lower tier of an application (e.g., app tier), as discussed with reference to FIG. 1. The packet sent from the client VCI 120 of a higher tier is received by LB module 136. LB module 136 accesses health information from HM module 134 for load balancing decisions, i.e., to select a server VCI 120 from a lower tier of an application, as discussed further with respect to FIG. 6. LB module 136 further sends the packet to the selected server VCI 120. The selected server VCI 120 from a lower tier of an application then processes the network packet.

Each tier of an application, meaning several (e.g., all) VCIs 120 of a tier of an application, may be associated with a "virtual address," such as virtual IP (VIP) address. The virtual address is different than an actual address, e.g., IP address, of each VCI 120. For example, each VCI 120 of a tier of an application may have its own IP address in its network (e.g., physical network or logical network). However, the VIP may be the same for multiple VCIs 120 of the tier. It should be noted that some VCIs 120 may be part of multiple tiers of an application and thus associated with multiple VIPs. VCIs 120 may be associated with a particular virtual address automatically by controller 132 or manually by an administrator.

Accordingly, when sending a packet to a lower tier of an application, a client VCI 120 may include in the header of the packet the VIP associated with the lower tier of an application as a destination address. The LB module 136 on the same host 105 as the client VCI 120 may be associated with the VIP and configured to receive packets with the VIP as a destination address (e.g., via a virtual switch configured to forward packets with the VIP destination address to LB module 136). The LB module 136 may include a mapping of each VIP to the actual IP addresses of the VCIs 120 associated with the VIP. Accordingly, when the LB module 136 selects a VCI 120 as a server VCI 120 to receive the packet, the LB module 136 sets a destination IP address of the packet to the IP address of the selected server VCI 120 and sends it to the selected server VCI 120 for processing.

Controller 132 may perform a variety of control functions for data center 102. Controller 132 may assign VCIs 120 to virtual addresses for load balancing by LB module(s) 136. Controller 132 may assign VCIs 120 to virtual addresses by, for example, analyzing presence of VCIs 120 on data center 102 and dividing the VCIs 120 into tiers of an application, as best suited for the functions of those application tiers, and then assigning virtual addresses to the tiers. Controller 132 may also assign VCIs 120 to virtual addresses when VCIs 120 are first instantiated on one of hosts 105. VCIs 120 may also be assigned to virtual addresses by an administrator. Controller 132 may maintain a record of which VCIs 120 are present on which hypervisor 116 within data center 102, and which VCIs are associated with which virtual address. Each LB module 136 may additionally maintain a record of which VCIs are associated with which virtual address. Controller 132 may be integrated with a VCI orchestration platform that assists with discovery of application tiers and other VCI pools. An example of a VCI orchestration platform is the open-source software Kubernetes®.

Gateway 124 provides VCIs 120 and other components in data center 102 with connectivity to network 146. Gateway 124 may manage external public IP addresses for VCIs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105.

Figure 2B:
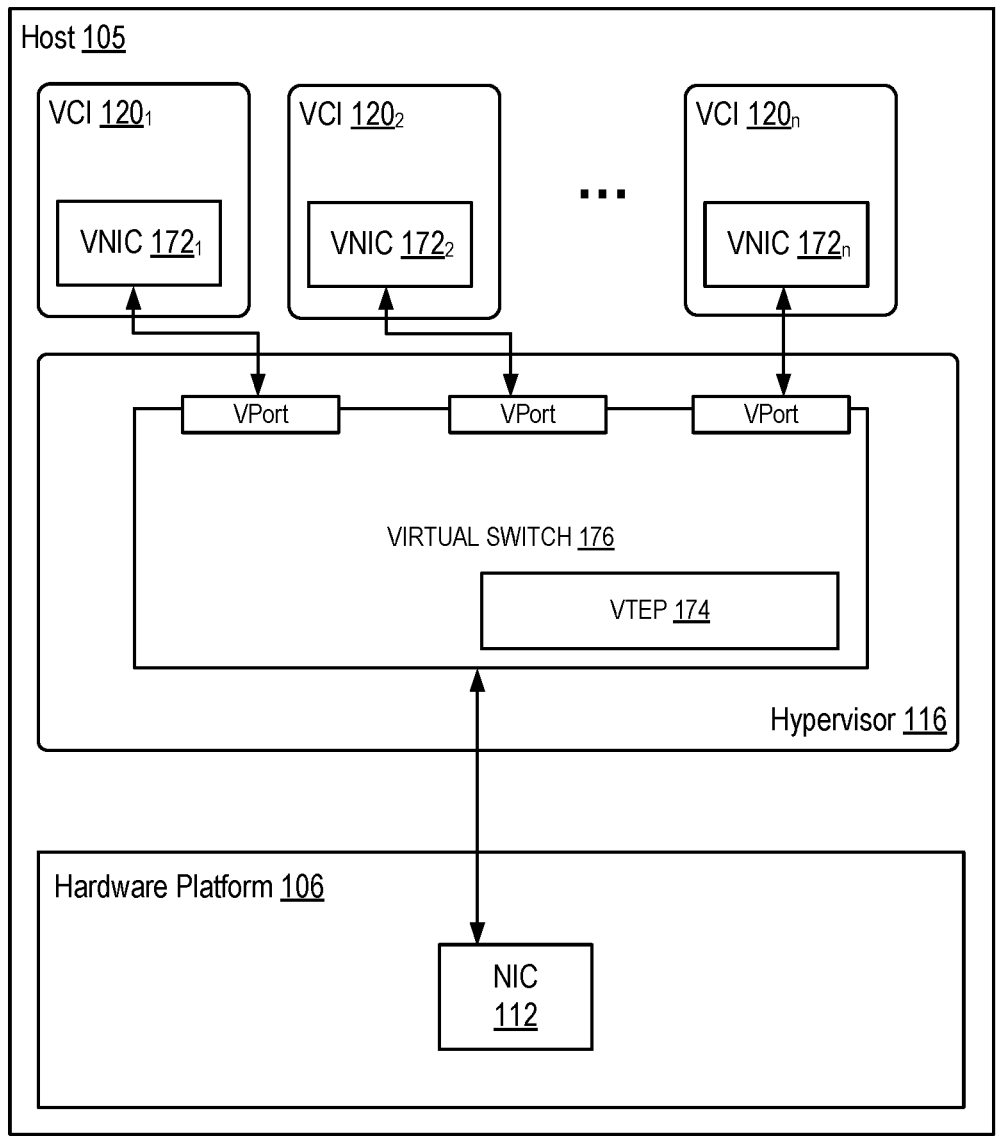
FIG. 2B depicts a block diagram showing details of a hypervisor that supports virtual tunnel endpoint networking, according to an embodiment.

FIG. 2B depicts a block diagram showing details of a host 105 running hypervisor 116, according to an embodiment. Hypervisor 116 includes an associated virtual tunnel endpoint (VTEP) 174. In the embodiment shown, VTEP 174 runs in the hypervisor 116. VTEP 174 may provide tunneling services for encapsulating egress packets from VCIs 120 and decapsulating ingress packets to implement a logical overlay network to interconnect VCIs 120 running on different host machines 105 as part of the same logical network topology. In the example described, the logical network topology is a Layer 2 logical network.

One method for hypervisors 116 to communicate with one another is through the respective VTEPs 174 associated with the hypervisors 116. Each VTEP 174 may be assigned a network address (e.g., MAC address and IP address) on a physical network (e.g., data network 122) to which hots 105 are connected and address packets between each other using network addresses. For example, VTEPs 174 may encapsulate packets using a tunneling protocol and exchange the encapsulated packets. VTEPs 174 may be implemented using tunneling protocols such as virtual extensible local area network (VXLAN), Stateless Transport Tunneling (STT), Generic Network Virtualization Encapsulation (GENEVE), or Generic Routing Encapsulation (GRE).

It should be noted that the term VTEP originally referred to a "VXLAN tunneling endpoint." However, while originally the term "VTEP" referred to "VXLAN" tunneling protocol, it is now often used regardless of the tunneling protocol, and therefore referred to herein as a "virtual" tunneling endpoint. This "backronym" can be misleading as the tunnel is not itself virtual, but does carry logical overlay networking traffic, which is sometimes referred to as virtual network traffic.

Hypervisor 116 may include a virtual switch 176, which serves as an interface between the hosted VCIs 120 running on host 105, NIC 112, as well as other physical resources available on host 105. Hypervisor 116 includes VTEP 174, which may be implemented in software by virtual switch 176, or outside of virtual switch 176 (e.g., as coupled to a virtual port of virtual switch 176) and functionally coupled to virtual switch 176 using forwarding tables. Accordingly, VTEP 174 is responsible for providing VTEP services for each of the VCIs 120 on the same host machine 105 as VTEP 174.

Each of the VCIs 120 may include a virtual network interface card (VNIC) 172, which is responsible for exchanging packets between the VCI 120 and hypervisor 116. VNICs 172 may be, in some cases, a software abstraction of a physical network interface card. Each VCI 120 is connected to a virtual port (vport) provided by virtual switch 176, and virtual switch 176 is connected to physical network interface 112 to allow network traffic to be exchanged between VCIs 120 executing on host machine 105 and other network destinations such as VCIs 120 hosted by other host machines 105 on data network 122.

A logical network is implemented using VTEPs 174 for encapsulating data packets that are generated by VCIs 120 or hypervisor 116 for delivery through the underlying data network 122. For example, a source VCI 120 running on host 105 may generate a packet for a destination VCI 120 on another host. The packet may include in a header a source address (e.g., IP/MAC address) of the source VCI 120, and a destination address of the destination VCI 120 on the other host 105. The source VCI 120 may send the packet to virtual switch 176.

Having received the packet, virtual switch 176 determines that the destination VCI is not directly coupled to the virtual switch 176 and thus forwards the packet to VTEP 174 to encapsulate the packet received from source VCI 120 to generate an encapsulated packet. In particular, VTEP 174 may add a new header (referred to as an "outer header") to the original packet to generate the encapsulated packet (referred to as an "outer packet"). The original packet encapsulated by VTEP 174 may be referred to as an "inner packet" and the header of the original packet may be referred to as an "inner header." The VTEP 174 may include a source address of the VTEP 174 (e.g., source VTEP) in the outer header, and a destination address of a destination VTEP associated with the destination VCI. VTEP 174 may then forward the encapsulated packet back to virtual switch 176, which sends the encapsulated packet out of host 105 via NIC 112 based on the destination address in the outer header.

The destination VTEP 174 receives the encapsulated packet and decapsulates the encapsulated packet to extract the original packet. Based on the destination IP address in the header of the original packet, the destination VTEP 174 forwards the original packet to the destination VCI 120.

Figure 3:
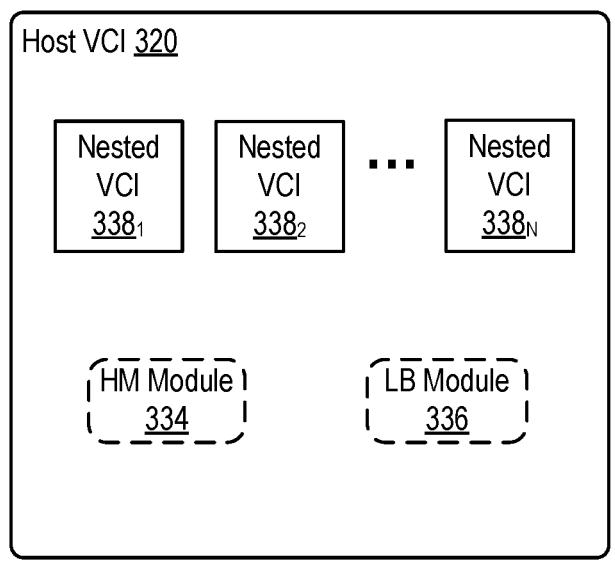
FIG. 3 depicts a block diagram showing an alternative location of the health monitoring module and the load balancing module, according to an embodiment.

FIG. 3 depicts a block diagram showing an alternative location of the HM module and the LB module, according to an embodiment. FIG. 3 shows an embodiment that may be used in a public cloud data center (which may be data center 102) in which access to hypervisor 116 of host 105 is limited, and in which placing HM module 134/334 and LB module 136/336 within hypervisor 116 is not possible. FIG. 3 shows host VCI 320, which is analogous to VCI 120 of FIG. 2. That is, host VCI 320 may run in data center 102 on host 105, and instead of LB module 136 and HM module 134 running on hypervisor 116, LB module 336 and HM module 334 may each run as an "agent" within each host VCI 320 of host computer 105. In an embodiment, host VCI 320 is a VM. The data center within which host VCI 320 runs may be substantially similar to the public data center shown and described in FIG. 2 of U.S. application Ser. No. 15/279,403, filed Sep. 28, 2016, the entire contents of which are incorporated by reference herein.

HM module 334 and LB module 336 are analogous to HM module 134 and LB module 136, respectively, of FIG. 2A. HM module 334 collects health information of nested VCIs 338 running on the same host VCI 320 as the HM module 334 collecting the health information. For the embodiment shown in FIG. 3, health information of VCIs 338 on the same host VCI 320 as the HM module 334 collecting the information may be referred to as "local" health information. Nested VCIs 338 run within host VCI 320, similarly to the manner in which VCIs 120 run within host computers 105 in FIG. 2A.

After each HM module 334 of data center 102 collects local health information, each HM module 334 shares its local health information with other HM modules 334 of data center 102, similarly to the manner of sharing of health data between HM modules 134 of FIG. 2. The shared health information of nested VCIs 338 of data center 102 is then provided to each LB module 336 for load balancing decisions, such as decision for load balancing of packets transmitted between nested VCIs 338.

Figure 4:
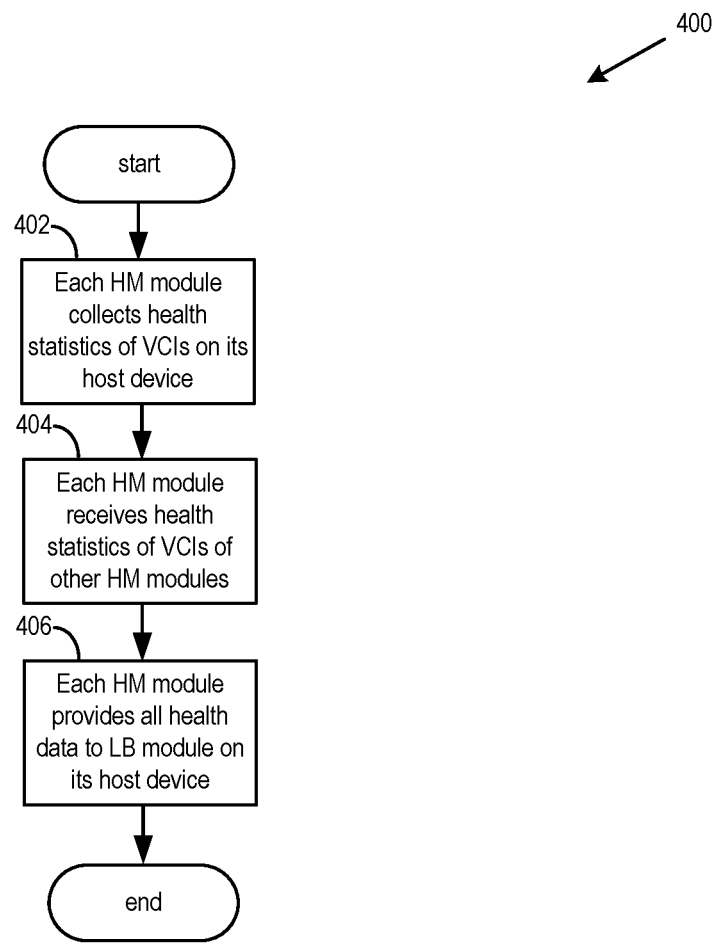
FIG. 4 depicts a flow diagram of a method of collecting and distributing health information of virtual computing instances, according to an embodiment.

FIG. 4 depicts a flow diagram of a method 400 of collecting and distributing health information of virtual computing instances, according to an embodiment. Method 400 of FIG. 4 encompasses the embodiment shown in FIG. 2A and the embodiment shown in FIG. 3. For purposes of describing method 400 of FIG. 4, the term "host device" refers to host 105 for the embodiment shown in FIG. 2A, and refers to host VCI 320 for the embodiment shown in FIG. 3.

At block 402, each HM module 134/334 collects local health information of VCIs 120/338. Each HM module 134/334 may know which VCIs 120/338 reside on the same host device as HM module 134/334 by accessing information stored within hypervisor 116, or by requesting information from controller 132.

At block 404, each HM module 134/334 transmits its local health information to every other HM module 134/334 within data center 102. As part of block 404, each HM module 134/334 also receives local health information of every other HM module 134/334 of data center 102.

At block 406, each HM module 134/334 provides all heath information of every VCI 120/338 to LB module 136/336 running on that same host device as the HM module 134/334 providing the health information. After block 406, method 400 ends and optionally proceeds to block 502 of method 500.

Figure 5:
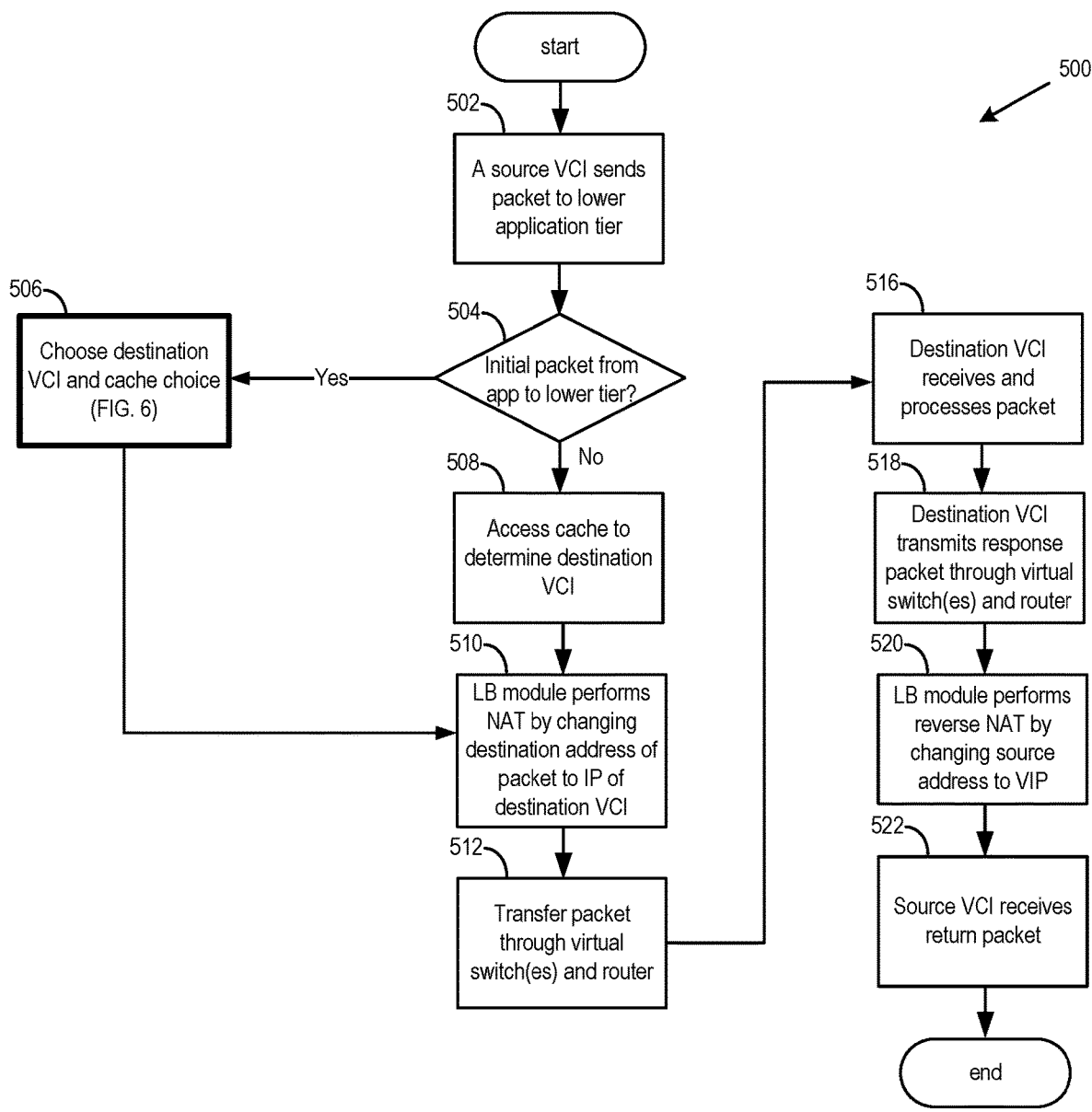
FIG. 5 depicts a flow diagram of a method of load balancing a packet, according to an embodiment.

FIG. 5 depicts a flow diagram of a method of load balancing a packet, according to an embodiment. Similarly to method 400, method 500 of FIG. 5 encompasses the embodiment shown in FIG. 2A and the embodiment shown in FIG. 3, and the term "host device" refers to host 105 for the embodiment shown in FIG. 2A, and refers to host VCI 320 for the embodiment shown in FIG. 3.

At block 502, a source or client VCI 120/338 sends a network packet to a virtual address, such as a virtual address representing a lower tier of an application. For example, a client VCI 120/338 may be within a web server tier of an application, and client VCI 120/338 may be sending a packet to a virtual address associated with server VCIs 120/338 that service requests of tiers of an application. Because the packet is addressed to a virtual address, and virtual addresses are associated with LB module 136/336, the packet is forwarded to LB module 136/336 via a virtual switch running in hypervisor 116/VCI 320.

At block 504, LB module 136/336 determines whether the packet is the initial packet along the connection between the particular client VCI 120/338 and LB module 136/336 associated with this particular virtual address. In an embodiment, the determination at block 504 may be performed by LB module 136/336 by referencing a cache (not shown) to see whether an entry exists. The entry may be indexed by a five-tuple consisting of a source IP, a destination IP, a source port, a destination port, and a protocol identifier. The index may then map to a target or destination server VCI 120/338 that was previously chosen by LB module 136/336 to process packets having a header matching the five-tuple index of the cache entry. The target or destination server VCI 120/338 may be indicated within a cache entry by a destination address and/or port address.

Still at block 504, if a cache entry for the packet exists, then LB module 136/336 has previously chosen a target server VCI 120/338 to load balance packets from the particular client VCI 120/338 addressed to the particular virtual address. Client VCI 120/338 may be indicated within a five-tuple of a cache entry by a source address and source port. If a cache entry for the packet exists, then method 500 proceeds to block 508. Block 508 represents a "fast path" of load balancing. If a cache entry for the packet does not exist, then the packet is the initial packet along the connection from the particular client VCI 120/338 to this particular virtual address, in which case method 500 proceeds to block 506. Block 506 is known as a "slow path" of load balancing. Block 506 is expanded and shown in more detail in FIG. 6.

Figure 6:
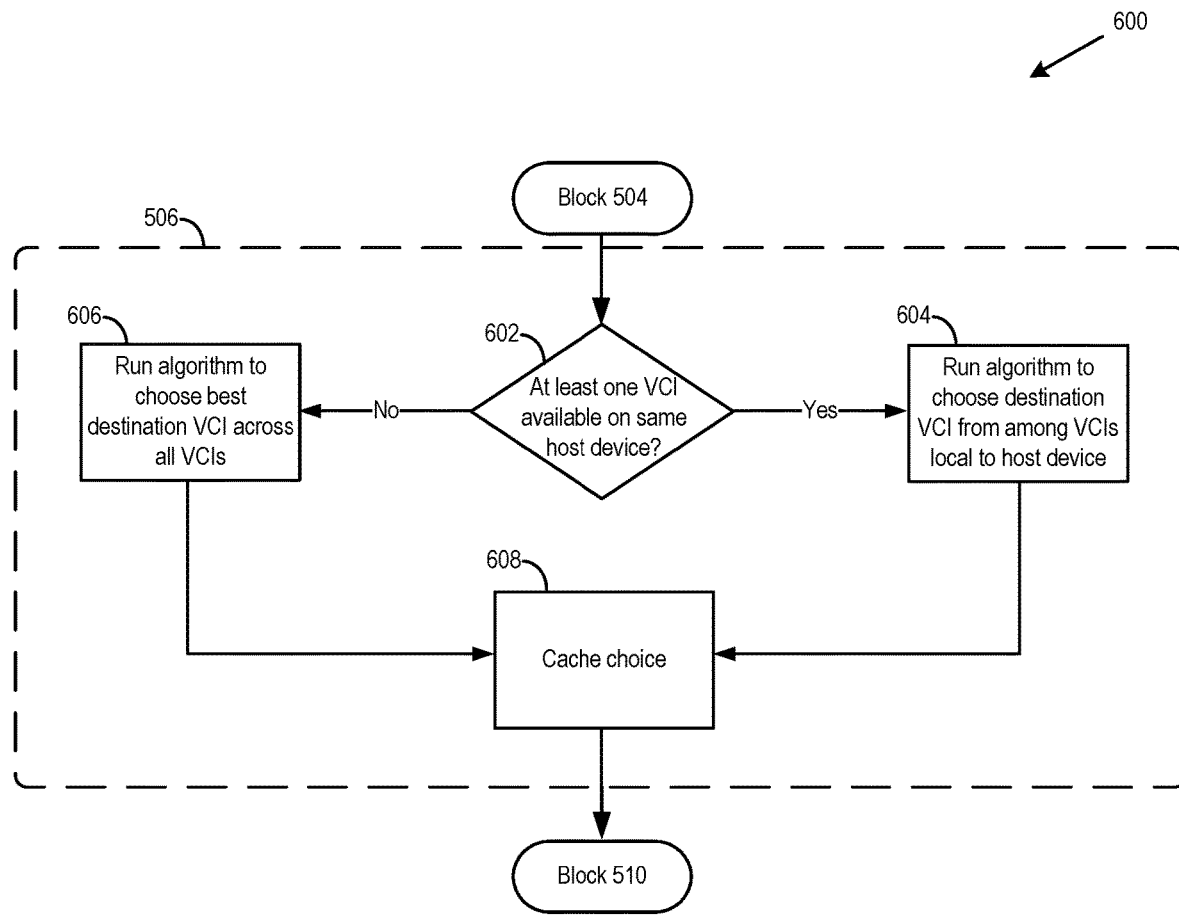
FIG. 6 depicts a flow diagram of a method of choosing a destination virtual computing instance when load balancing a packet, according to an embodiment.

FIG. 6 depicts a flow diagram of a method 600 of choosing a destination VCI 120/338 when load balancing a packet, according to an embodiment. FIG. 6 depicts an exemplary approach to load balancing, and alternative approaches are possible consistent with the teachings herein. Similarly to method 400, method 600 of FIG. 6 encompasses the embodiment shown in FIG. 2A and the embodiment shown in FIG. 3, and the term "host device" refers to host 105 for the embodiment shown in FIG. 2A, and refers to host VCI 320 for the embodiment shown in FIG. 3.

At block 602, LB module 136/336 determines whether a destination or target server VCI 120/338 associated with the virtual address of block 502 is available on the same host device 105/320 as client VCI 120/338. As part of block 602, LB module 136/336 further determines whether the available VCI 120/338 (if one is available) has enough resources such as memory, CPU, etc., to process requests from client VCI 120/338. If so, then method 600 continues to block 606. It should be noted that method 600 may always proceed from block 602 to block 604 when conditions described above are met, or method 600 may proceed from block 602 to 604 a percentage of the time when conditions are met, such as two-thirds, or three-quarters of the time. This can be accomplished, for example, by assigning weights to each potential target server VCI 120/338, and running an algorithm in which server VCIs on the same host device 105/320 as the client VCI 120/338 are assigned higher weights or priorities than other potential target server VCIs 120/338 running on other host devices.

Still at block 602, if a target VCI 120/338 associated with the virtual address of block 502 is not available on the same host device 105/320 as client VCI 120/338, or if a VCI 120/338 is available but lacks resources to process requests from the client VCI 120/338, then method 600 proceeds to block 606.

At block 604, LB module 136/336 chooses a destination or target server VCI 120/338 from among server VCI(s) 120/338 associated with the virtual address of block 502 on the same host device 105/320 as client VCI 120/338. That is, LB module 136/336 attempts to load balance the packet such that VCIs 120/338 that are on the same host device 105/320 might service one another's requests. For example, assume client VCI 120 of block 502 is an app tier VCI 120 and is located on host 105. If a data tier VCI 120 is running on the same host, then LB module 136 may load balance the packet from client VCI 120 to a data tier VCI 120 located on the same host. An approach in which LB module 136/336 gives preference to local VCIs 120 when making load balancing decisions may be referred to as "affinity-based" load balancing. Such load balancing lowers congestion of network(s) of data center 102, because it lowers the number of packets transmitted between host devices 105/320 over the data network 122. After block 604, method 600 proceeds to block 608.

At block 606, LB module 136/336 runs an algorithm to choose a destination or target server VCI 120/338 to process packets from client VCI 120/338. The algorithm may be a static algorithm, such as a round robin, weighted round robin, blue-green, or a hash based algorithm. However, one advantage of having dynamic up-to-date health information on VCIs 120/338 of data center 102 is that LB module 136/336 may use a dynamic algorithm for the load balancing function. For example, LB module 136/336 may use health information collected by method 400 to execute an algorithm such as a least loaded or a least connections based algorithm. After block 606, method 600 proceeds to block 608.

At block 608, LB module 136/336 caches an association between client VCI 120/338 and target server VCI 120/338 chosen at either block 604 or block 606. As discussed above, the caching may include a cache entry, where the index of the cache entry is mapped to the chosen target server VCI 120/338. The index may include a five-tuple consisting of a source IP, a destination IP, a source port, a destination port, and a protocol identifier, such that a unique combination of these five elements maps to the chosen target server VCI 120/338, which then load balances packets originating from a client VCI 120/338 identifiable by the five-tuple. After block 608, method 600 proceeds to block 510 of method 500.

Returning to block 504 of FIG. 5, if the packet of block 502 is not the initial packet for the connection between the particular client VCI 120/338 to LB module 136/336 of this particular virtual address, using this particular protocol, then method 500 proceeds to block 508. As stated, the determination at block 504 may be made by consulting a cache to determine whether, for example, a five-tuple corresponding to the packet is present within the cache. Method 500 proceeds from block 504 to block 508 if, for example, method 600 had been previously performed.

At block 508, LB module 136/336 accesses a cache to obtain a target server VCI 120/338 for load balancing the packet received at block 502. At block 510, LB module 136/336 performs network address translation (NAT) by modifying the destination address of the packet of block 502 from the virtual address to the network address of the chosen target server VCI 120/338 selected to process the packet. Optionally, LB module 136/336 also changes the source address of the packet from the client VCI 120/338 of block 502 to a virtual address associated with LB module 136/336. At block 512, the packet is transferred to the target or destination VCI 120/338 through virtual switches, virtual routers, and/or VTEPs, as may be present within data center 102 as discussed.

At block 516, target server VCI 120/338 receives and processes the packet. For example, if the packet had been a request for data sent from an app tier of an application to a data tier of an application, then target server VCI 120/338 would obtain the requested data and package it into one or more response packet(s) for transmission.

At block 518, target server VCI 120/338 transmits at least one response packet. The packet is transmitted through virtual switches and/or routers that may be present on data center 102. The response packet may be addressed to a virtual address that target server VCI 120/338 perceives as the source address of the packet target server VCI 120/338 received, such as the virtual address associated with LB module 136/336. Alternatively, the response packet may be addressed directly to client VCI 120/338 of block 502, in which case blocks 520 and 522 of method 500 are skipped.

At block 520, LB module 136/336 receives the response packet and performs a reverse NAT so as to change the source address of the packet from the target server VCI 120/338 to the virtual address to which the packet of block 502 had been addressed. LB module 136/336 may also change the destination address of the response packet to the network address of source/client VCI 120/338 of block 502. LB module 136/336 then transmits the response packet to client VCI 120/338. At block 522, client VCI 120/338 receives the response packet and method 500 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASICs), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of load balancing a network packet, the method comprising:

receiving, by a first health monitoring (HM) module running on a first host device of a data center, from a first plurality of virtual computing instances (VCIs) that are running on the first host device, first health information of the first plurality of VCIs;

receiving, by the first HM module running on the first host device, from a second HM module running on a second host device of the data center, second health information of a second plurality of VCIs that are running on the second host device, wherein the second health information was transmitted directly to the first HM module by the second HM module;

combining, by the first HM module running on the first host device, the first health information and the second health information to produce combined health information;

providing, by the first HM module to a first load balancing (LB) module running on the first host device, the combined health information;
receiving, at the first LB module, a first network packet; and
selecting, by the first LB module, a destination VCI from the first plurality of VCIs or the second plurality of VCIs to process the first network packet based on the combined health information.

2. The method of claim 1, wherein the second host device includes a second LB module that receives the combined health information from the second HM module.

3. The method of claim 1, wherein the first host device comprises one of a physical host machine or a host VCI running on the physical host machine.

4. The method of claim 1, wherein the receiving the first network packet comprises receiving the first network packet from a first VCI running on the first host device, the method further comprising:
subsequent to the selecting, changing a destination address of the first network packet to the destination address of the destination VCI; and
receiving from the destination VCI, by the first LB module, a response network packet.

5. The method of claim 4, wherein the changing a destination address comprises changing an original destination address to the destination address of the destination VCI, wherein the original destination address is a virtual address associated with a subset of VCIs of the first plurality of VCIs or the second plurality of VCIs.

6. The method of claim 1, wherein the receiving the first health information comprises receiving local health information of the first plurality of VCIs running on the first host device.

7. The method of claim 1, wherein the selecting the destination VCI comprises assigning a higher priority to VCIs of the first plurality of VCIs than to VCIs of the second plurality of VCIs.

8. The method of claim 1, wherein the first health information comprises information on a number of connections of each VCI of the first plurality of VCIs, central processing unit (CPU) utilization by each VCI of the first plurality of VCIs, memory utilization by each VCI of the first plurality of VCIs, whether each VCI of the first plurality of VCIs is operational, or whether a service running on each VCI of the first plurality of VCIs is operational.

9. The method of claim 1, further comprising, responsive to the selecting, storing within a cache a mapping between (a) at least one identifier of a source of the network packet, and (b) the destination VCI.

10. A non-transitory computer readable medium comprising instructions to be executed in a processor of a computer system, the instructions when executed in the processor cause the computer system to carry out a method of load balancing a network packet, the method comprising:
receiving, by a first health monitoring (HM) module running on a first host device of a data center, from a first plurality of virtual computing instances (VCIs) that are running on the first host device, first health information of the first plurality of VCIs;
receiving, by the first HM module running on the first host device, from a second HM module running on a second host device of the data center, second health information of a second plurality of VCIs that are running on the second host device, wherein the second health information was transmitted directly to the first HM module by the second HM module;
combining, by the first HM module running on the first host device, the first health information and the second health information to produce combined health information;
providing, by the first HM module to a first load balancing (LB) module running on the first host device, the combined health information;
receiving, at the first LB module, a first network packet; and
selecting, by the first LB module, a destination VCI from the first plurality of VCIs to process the first network packet based on the combined health information.

11. The non-transitory computer readable medium of claim 10, wherein the second host device includes a second LB module that receives the combined health information from the second HM module.

12. The non-transitory computer readable medium of claim 10, wherein the first host device comprises one of a physical host machine or a host VCI running on the physical host machine.

13. The non-transitory computer readable medium of claim 10, wherein the receiving the first network packet comprises receiving the first network packet from a first VCI running on the first host device, the method further comprising:
subsequent to the selecting, changing a destination address of the first network packet to the destination address of the destination VCI; and
receiving from the destination VCI, by the first LB module, a response network packet.

14. The non-transitory computer readable medium of claim 13, wherein the changing a destination address comprises changing an original destination address to the destination address of the destination VCI, wherein the original destination address is a virtual address associated with a subset of VCIs of the first plurality of VCIs or the second plurality of VCIs.

15. The non-transitory computer readable medium of claim 10, wherein the receiving the first health information comprises receiving local health information of the first plurality of VCIs running on the first host device.

16. The non-transitory computer readable medium of claim 10, wherein the selecting the destination VCI comprises assigning a higher priority to VCIs of the first plurality of VCIs than to VCIs of the second plurality of VCIs.

17. The non-transitory computer readable medium of claim 10, wherein the first health information comprises information on a number of connections of each VCI of the first plurality of VCIs, central processing unit (CPU) utilization by each VCI of the first plurality of VCIs, memory utilization by each VCI of the first plurality of VCIs, whether each VCI of the first plurality of VCIs is operational, or whether a service running on each VCI of the first plurality of VCIs is operational.

18. The non-transitory computer readable medium of claim 10, further comprising, responsive to the selecting, storing within a cache a mapping between (a) at least one identifier of a source of the network packet, and (b) the destination VCI.

19. A computer system comprising:
a first host device of a data center, the first host device comprising a first health monitoring (HM) module and a first plurality of virtual computing instances (VCIs);
a second host device of the data center, the second host device comprising a second HM module and a second plurality of VCIs; and a processor, wherein the processor is programmed to carry out a method of load balancing a network packet, the method comprising:
- receiving, by the first HM module, from the first plurality of VCIs, first health information of the first plurality of VCIs;
- receiving, by the first HM module, from the second HM module, second health information of the second plurality of VCIs;
- combining, by the first HM module, the first health information and the second health information to produce combined health information;
- providing, by the first HM module to a first load balancing (LB) module running on the first host device, the combined health information;
- receiving, at the first LB module, a first network packet; and
- selecting, by the first LB module, a destination VCI from the first plurality of VCIs to process the first network packet based on the combined health information wherein preference is given to potential destination VCIs in the first plurality of VCIs over alternative potential destination VCIs in the second plurality of VCIs based on the first plurality of VCIs being on the same first host device as the first LB module.

20. The computer system of claim 19, wherein the second host device includes a second LB module that receives the combined health information from the second HM module.

* * * * *